United States Patent [19]

Ritsema et al.

[11] 4,334,599
[45] Jun. 15, 1982

[54] DISC BRAKE AND MOUNTING PIN ASSEMBLY THEREFOR

[75] Inventors: Irving R. Ritsema; Ji Y. Woo, both of South Bend, Ind.

[73] Assignee: The Bendix Corporation, Southfield, Mich.

[21] Appl. No.: 179,322

[22] Filed: Aug. 18, 1980

[51] Int. Cl.³ .............................................. F16D 65/02
[52] U.S. Cl. .................................. 188/73.45; 403/90; 403/408; 411/537; 411/367
[58] Field of Search .......................... 188/73.3, 73.45; 403/408, 90; 411/367, 370, 537, 538

[56]  References Cited
U.S. PATENT DOCUMENTS

| 663,464 | 12/1900 | Prince | 411/367 |
|---|---|---|---|
| 1,411,261 | 4/1922 | Baker | 411/367 |
| 3,220,289 | 11/1965 | Farekas | 411/537 |
| 3,656,590 | 4/1972 | Newstead | 188/73.3 |
| 3,682,277 | 8/1972 | Brown | 188/73.3 |
| 3,749,362 | 7/1973 | O'Connor et al. | 411/537 |
| 4,084,666 | 4/1978 | Karasudani | 188/73.3 |

FOREIGN PATENT DOCUMENTS

| 54-144556 | 10/1979 | Japan | 188/73.3 |
|---|---|---|---|
| 55-44107 | 3/1980 | Japan | 188/73.3 |

Primary Examiner—Edward R. Kazenske
Attorney, Agent, or Firm—Paul David Schoenle; Ken C. Decker

[57]  ABSTRACT

A disc brake includes at least one pin assembly (24) for movably supporting a caliper 14 relative to a torque plate 12. The pin assembly comprises a bolt (54), a sleeve (46) and a pair of arcuate washers (70, 72) which are adapted to accommodate angularity between the pin assembly and the caliper opening (38).

1 Claim, 6 Drawing Figures

DISC BRAKE AND MOUNTING PIN ASSEMBLY THEREFOR

The present invention relates to a disc brake which includes a caliper slidably mounted on at least one pin assembly. The pin assembly is releasably secured to a torque plate and the caliper cooperates with a pair of friction pads to engage the latter with a rotor during a brake application.

A disc brake with a pair of pin assemblies requires substantially zero drag for the caliper when the latter slides on the pin assemblies during braking and also upon termination of braking when the caliper is retracted to permit the friction pads to disengage the rotor. The pair of pin assemblies threadably engage openings on the torque plate and extend therefrom to slidably fit within openings on the caliper. If the openings on the torque plate are not exactly coaxial with the openings on the caliper, the pin assemblies will be off center within the caliper openings to wedge against the walls of the caliper openings. This wedging is detrimental to the free sliding required of the caliper.

Another problem with the pin assemblies of a disc brake, is the possibility of either pin assembly forming an angle relative to the caliper opening. In this situation no amount of lateral adjustment will concentrically align the pin assembly within the caliper opening. If the axis of the opening on the torque plate is not exactly normal (at an angle other than 90°) to a torque plate face the pin assembly will form an angle relative to the caliper opening. Also, if the pin assembly is not linear, or, if the torque plate face forms an angle other than 90° with the axis of the torque plate opening, it is possible for the pin assembly to form an angle relative to the caliper opening and develop unwanted friction opposing the sliding movement of the caliper on the pin assembly.

The prior art is illustrated in U.S. Pat. No. RE. 29582, and U.S. Pat. No. 4,121,698.

The present invention provides a remedy to accommodate lateral alignment of the caliper and torque plate openings as well as angular orientation of at least one pin assembly within a caliper opening. The one pin assembly includes a sleeve slidably engaging the wall of its corresponding caliper opening, a bolt releasably secured to the torque plate via a threaded opening to retain the sleeve within the caliper opening, and a pair of washers engageable with the sleeve. The bolt passes through oversized openings on the pair of washers and the sleeve to accommodate lateral movement of the washers and sleeve relative to the bolt and each washer cooperates with the sleeve to define an annular arcuate surface or interface therebetween. One of the washers opposes the end of the bolt opposite the torque plate and the other washer is retained in engagement with the face of the torque plate by the sleeve.

In a preferred embodiment, the other pin assembly is designed to take substantially all of the braking torque. The other pin assembly includes a bolt, a sleeve and a pair of wedge washers. The wedge washers are disposed within a clearance between the bolt and sleeve to substantially prevent lateral displacement between the sleeve and bolt. With the other pin assembly defining a substantially fixed anchor member for absorbing torque, the one pin assembly accommodates lateral movement to permit a close sliding fit between the one pin assembly and its caliper opening. As earlier mentioned, the one pin assembly also accommodates angularity, which could result between the one pin assembly and the caliper, or between the caliper and the torque plate, in view of manufacturing tolerances associated with the closer sliding fit defined by the other pin assembly.

The advantages offered by the present invention are that the pair of pin assemblies compensate for both lateral movement to align the pin assemblies with openings in the caliper and torque plate and angularity to prevent wedging between the pin assemblies and the caliper during movement of the latter.

The attached drawings illustrate how to carry out the invention.

Figure 2:
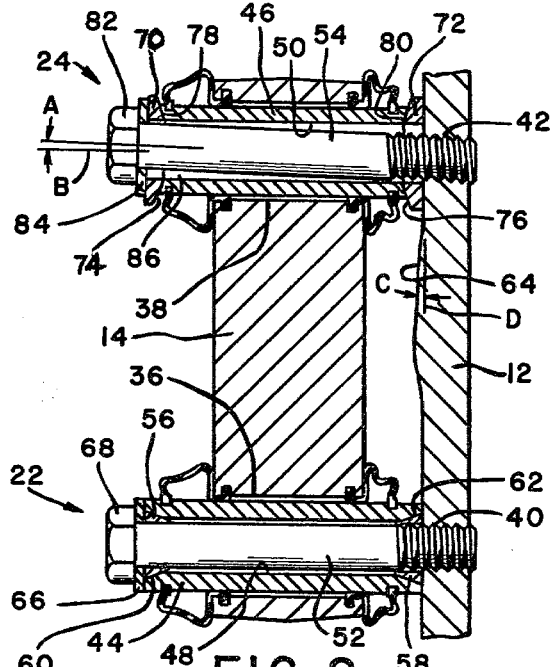
FIG. 2 is an enlarged cross section view taken along line 2—2 of FIG. 1.
Figure 6:
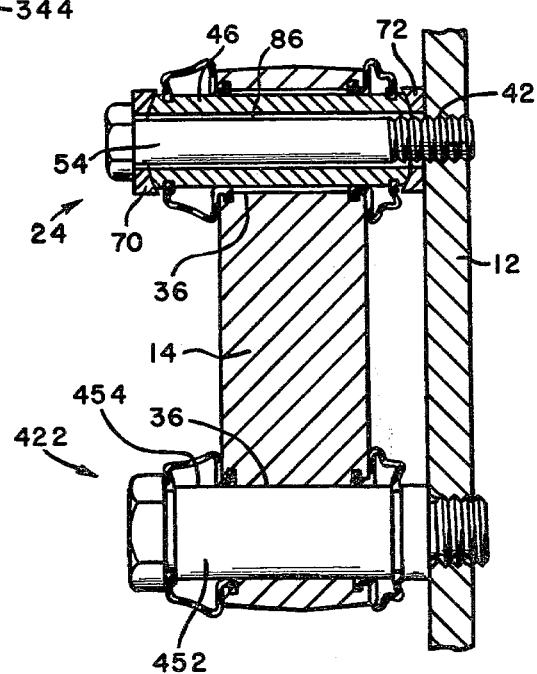

and FIG. 6 is a view similar to FIG. 2, showing a fourth alternative embodiment.

Figure 1:
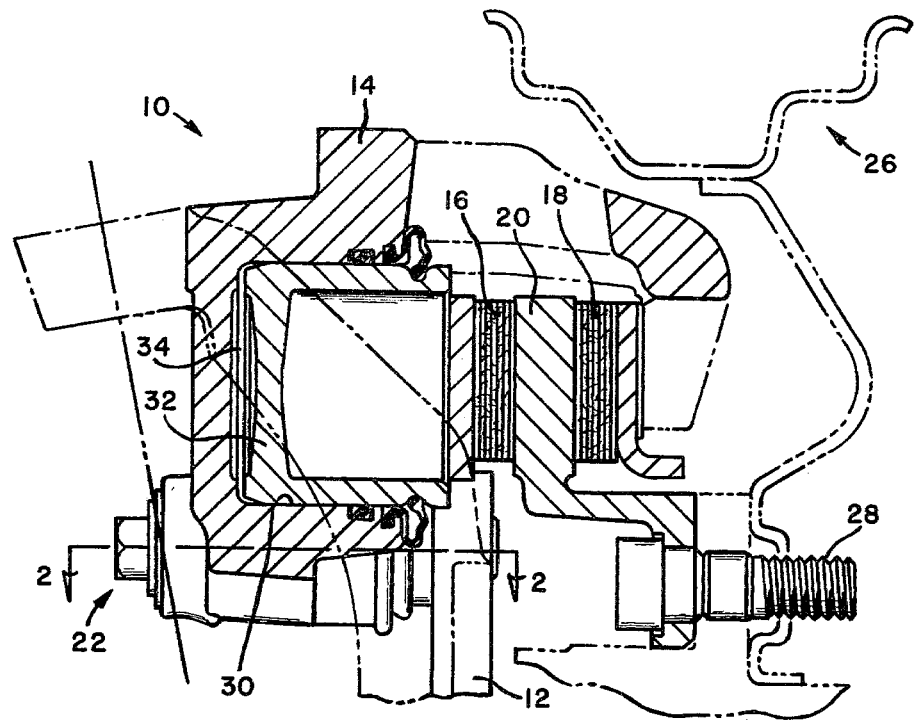
FIG. 1 is a cross sectional view of a disc brake assembly.

In FIG. 1 a disc brake assembly 10 includes a torque plate or support 12 fixed to a vehicle frame (not shown), a caliper 14 movable relative to the support, a pair of friction elements 16 and 18 cooperating with the caliper to engage a rotor 20 during braking, and a pair of pin assemblies 22 and 24 (only assembly 22 being shown in FIG. 1) to movably mount the caliper 14 relative to the support. The rotor 20 is connected to a rotating wheel assembly 26 in a conventional manner via stud 28. The caliper includes a bore 30 for receiving a piston 32 and a pressure chamber 34 receives fluid pressure during braking to bias the piston towards the rotor.

In FIG. 2 it is seen that the caliper includes openings 36 and 38 for receiving pin assemblies 22 and 24, respectively, and the support 12 defines threaded bores 40 and 42 releasably securing the pin assemblies thereto. Each pin assembly 22 and 24 includes respective sleeves 44 and 46 with openings 48 and 50 for receiving bolts 52 and 54. The pin assembly 22 also includes a pair of wedge washers 56 and 58 disposed between the bolt 52 and the sleeve 44 which is relieved with tapered surfaces 60 and 62 for receiving the wedge washers 56 and 58. The wedge washer 58 engages a face 64 of support 12 and substantially takes up any radial clearance between the bolt 52 and sleeve 44 adjacent the face 64. The wedge washer 56 engages a ring 66 opposing the bolt head 68 and substantially takes up any radial clearance between the bolt 52 and sleeve 44 adjacent the ring 66 or head 68. The pin assembly 24 includes a pair of arcuate washers 70 and 72 engageable with the sleeve 46. Both washers define arcuate surfaces 74 and 76 which cooperate with matching arcuate surfaces 78 and 80 on sleeve 46 in a manner hereinafter described. The arcuate washer 70 opposes the bolt head 82 via ring 84 and the arcuate washer 72 is engageable with the face 64.

When comparing pin assembly 22 with pin assembly 24, the arcuate washers 70 and 72 define openings substantially equal in diameter to sleeve opening 50 and these openings form a large clearance 86 with bolt 54. The wedge washers 56 and 58 define openings substantially equal in diameter to the diameter of bolt 52, and these openings form a close fit with bolt 52. Consequently, it is possible to secure the pin assemblies to the support openings 40 and 42 via lateral displacement of bolt 54 even though the caliper openings 36 and 38 are not perfectly aligned with the support openings. In addition, if the face 64 forms an angle relative to the axis of opening 38 other than 90°, or if the opening 42 forms an angle relative to the axis of opening 38, the bolt 54 or sleeve 46 will also form an angle relative to the opening 38. If this angular orientation of the bolt 54 relative to the opening 38 is not corrected the bolt and sleeve will be tightly forced into engagement with the wall of opening 38 to generate excessive friction during movement of the caliper relative to the sleeve 46. A solution to this problem is provided by the arcuate washers because the sleeve 46 is free to take an axially aligned position with the opening 38 even though the bolt 54 is skewed relative to the axis of the opening 38. For example, the bolt 54 is shown in FIG. 2 defining an angle A relative to the axis B of opening 38. In this position the bolt 54 is pivoted clockwise relative to face 64 and the arcuate washer 70 rotated clockwise relative to the arcuate surface 78 of sleeve 46. Also the face 64 is shown in FIG. 2 defining an angle C relative to a normal axis D of the opening 38 so that the arcuate surface 80 of sleeve 46 is rotated clockwise relative to the arcuate washer 72.

The orientation of the caliper 14 relative to the support 12 is controlled by the pin assembly 22 and the pin assembly 24 is adopted via the arcuate washers and the large clearance to accommodate any manufacturing lateral offset of openings 38 and 42 and any angularity imposed by opening 38, opening 42, face 64 or bolt 54. The pin assembly 22 is also adapted to absorb substantially all of the braking torque transmitted to the caliper 14 because of the close fit between bolt 52 and sleeve opening 48 and the wedge washers 56 and 58.

Figure 3:
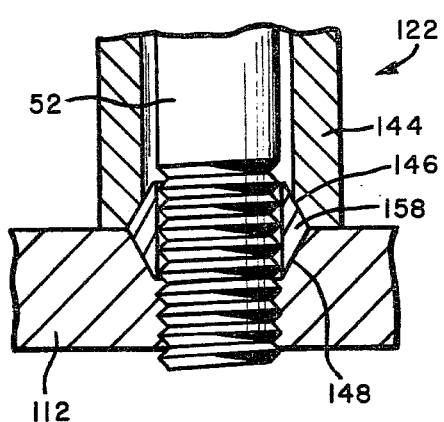
FIG. 3 is an enlarged view showing a first alternative embodiment.

In the alternative pin assembly 122 of FIG. 3, the sleeve 144 is relieved via tapered surface 146 to partially receive the wedge washer 158. Also the support 112 is relieved via tapered surface 148 to receive the remaining portion of wedge washer 158. As a result any lateral movement of the sleeve 144 is opposed by the interference between the wedge washer and the bolt and also between the wedge washer and the support.

Figure 4:
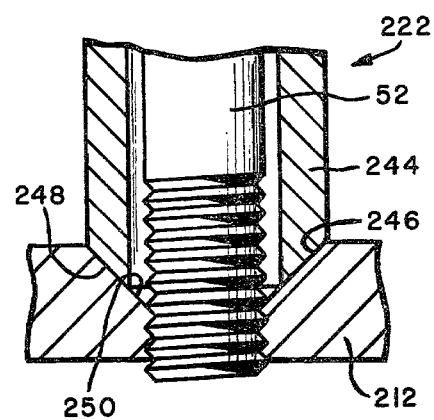
FIG. 4 is a view similar to FIG. 3, showing a second alternative embodiment.
Figure 5:
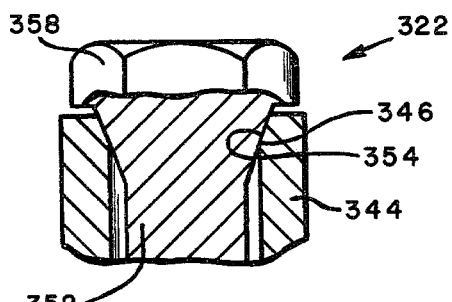
FIG. 5 is an enlarged view showing a third alternative embodiment.

Turning to FIG. 4, the pin assembly 222 includes a sleeve 244 with a frusto conical surface 246 engageable with a tapered surface 248 of the support 212. Because the sleeve 244 is partially received within the recess 250 defining the tapered surface 248, lateral movement of the sleeve is opposed by the support 212. With this construction it is possible to eliminate a wedge washer adjacent the support 212. Also in FIG. 5, the bolt 352 of pin assembly 322 includes a frusto conical surface 354 engageable with a tapered surface 346 of sleeve 344 to retain the sleeve secured relative to the support and to oppose lateral movement of the sleeve. Consequently, the structure of FIG. 5 eliminates the need for a wedge washer adjacent the bolt head 358.

Finally, in FIG. 6 the pin assembly 422 which replaces the prior pin assemblies 22, 122, 222 and 322 comprises a bolt 452 with an outer surface 454 in substantially close sliding fit with the caliper opening 36. Because of the close sliding fit of bolt 452, the other pin assembly 24 is adapted to accommodate any lateral offset between openings 36 and 42 via the clearance 86, and also to accommodate angularity between the axis of opening 36 and pin assembly 24 via the arcuate washer 70 and 72.

Although FIG. 2 shows the arcuate surfaces of the washers and the sleeve having radii of curvature extending in opposite directions, it is possible to reverse the concavity of the arcuate surfaces at each washer and its associated end of the sleeve, as shown in FIG. 6 at pin assembly 24. Many other modifications and/or variations are feasible by one skilled in the art and, as such, are included within the scope of the appended claims.

We claim:

1. In a disc brake assembly, the combination of, a torque member disposed adjacent a rotor to be braked, a pair of pin assemblies extending from the torque member in a direction opposite the rotor, a caliper slidable on said pin assemblies and cooperating with a pair of friction elements to urge the latter into engagement with the rotor, each of said pair of pin assemblies including a sleeve defining an opening, a bolt extending through said opening to engage said torque member, and a pair of washers, said bolts being secured to said torque member in order to retain said sleeves fixedly disposed relative to said torque member, said washers of one pin assembly engageable respectively with opposite ends of said sleeve of said one pin assembly and cooperating therewith to substantially prevent lateral movement of said sleeve of said one pin assembly relative to said bolt of said one pin assembly, said washers of the other pin assembly engageable respectively with opposite ends of said sleeve of said other pin assembly and cooperating therewith to permit angular orientation of said sleeve of said other pin assembly relative to said bolt of said other pin assembly, said washers of said other pin assembly also permitting lateral movement of said sleeve of said other pin assembly relative to said bolt of said other pin assembly, said washers of said other pin assembly defining openings therethrough substantially equal in diameter to said opening in said sleeve of said other pin assembly to form a large clearance with said bolt of said other pin assembly, said washers of said one pin assembly defining openings therethrough substantially equal in diameter to said bolt of said one pin assembly to form a close fit therewith, said washers of said one pin assembly being formed with conically tapered surfaces and said opposite ends of said sleeve of said one pin assembly being tapered to receive said tapered surfaces of said washers of said one pin assembly therein to thereby prevent said lateral movement, said washers of said other pin assembly being formed with arcuate surfaces and said opposite ends of said sleeve of said other pin assembly having corresponding arcuate surfaces engageable with said arcuate surfaces of said washers of said other pin assembly to thereby permit said angular orientation and lateral movement.

* * * * *